United States Patent [19]

Yehonatan

[11] Patent Number: 5,351,241
[45] Date of Patent: Sep. 27, 1994

[54] TWISTED PAIR ETHERNET HUB FOR A STAR LOCAL AREA NETWORK

[75] Inventor: Mivtza Yehonatan, Haifa, Israel
[73] Assignee: Intel Corporation, Santa Clara, Calif.
[21] Appl. No.: 996,699
[22] Filed: Dec. 24, 1992
[51] Int. Cl.$^5$ .......................................... H04L 12/44
[52] U.S. Cl. .................................. 370/85.3; 370/94.3
[58] Field of Search ..................... 370/85.2, 94.3, 85.6, 370/85.7, 95.1, 85.3, 85.1, 60, 94.1; 340/825.02, 825.03, 825.06, 825.5, 825.51

[56] References Cited

U.S. PATENT DOCUMENTS

| | | | |
|---|---|---|---|
| 4,560,985 | 12/1985 | Strecker et al. | 370/85.3 |
| 4,594,706 | 6/1986 | Kobayashi | 370/85.3 |
| 4,646,361 | 2/1987 | Usui | 370/85.2 |
| 4,701,909 | 10/1987 | Kavehrad et al. | 370/85.3 |
| 4,866,702 | 9/1989 | Shimizu | 370/94.3 |
| 4,872,163 | 10/1989 | Follett et al. | 370/85.2 |
| 4,945,532 | 7/1990 | Hald | 370/85.3 |
| 5,073,982 | 12/1991 | Viola et al. | 370/94.3 |
| 5,140,585 | 8/1992 | Tomikawa | 370/96.3 |

Primary Examiner—Wellington Chin
Assistant Examiner—Huy D. Vu
Attorney, Agent, or Firm—Owen L. Lamb

[57] ABSTRACT

A hub in a star local area network (LAN). A single station, called the preferred station, is dynamically selected to perform a transmission. When two or more stations attempt to transmit simultaneously, one currently preferred station goes through, while all others sense collisions. The currently preferred station is dynamically selected by performing a precedence algorithm which is a fairness and deterministic algorithm. If the station receiving from the preferred station also attempts to transmit, then it senses a collision and the hub lets it recover and enable itself for receiving before transmitting the frame. This is done by storing the preferred station frame in an internal small first-in first-out (FIFO) buffer. The hub resends the frame from the FIFO immediately after Inter Frame Spacing (IFS) while the receive station attempts to transmit later. If after a number of attempts the hub does not succeed in transmitting the frame successfully, then the hub generates a collision frame.

7 Claims, 4 Drawing Sheets

TWISTED PAIR ETHERNET HUB FOR A STAR LOCAL AREA NETWORK

BACKGROUND OF THE INVENTION

1. Field of the Invention

The invention relates to data processing systems and more particularly to a method and apparatus for communicating among a plurality of network nodes connected to the hub of a local area network.

2. Description of the Related Art

A Local Area Network, or LAN, is a data communications system which allows a number of independent devices to communicate with each other within a moderately sized geographical area. The term LAN is used to describe networks in which most of the processing tasks are performed by a workstation such as a personal computer rather than by shared resources.

A LAN node consists of a desktop workstation which performs processing tasks and serves as the user's interface to the network. A wiring system connects the workstations together, and a software operating system handles the execution of tasks on the network.

The configuration of the various pieces of the network is referred to as the topology. In a star topology, such as that defined in the IEEE 802.3 10 base-T network standard or the 100 Mbps EtherNet based on a star topology, the switching control is at the center of the network. All of the attached devices, the individual workstations, shared peripherals, and storage devices, are on individual links directly connected to the center of the star. In the star configuration, all of these devices communicate with each other through the center which receives signals and transmits them out to their appropriate destinations.

Star topologies have the advantage that the workstations can be placed at a considerable distance from the center of the star. In the star configuration the center of the star is involved in all of the communication signals. In a bus topology, communications messages have no central controller. Each device attempts to send signals and enter onto the bus when it needs to. If some other device tries to enter at the same time, contention occurs. To avoid interference (collision) between two competing signals, bus networks have signaling protocols that allow access to the bus by only one device at a time. The more traffic a network has, the more likely it is that a contention will occur. Consequently, the performance of a bus network is degraded if it is overloaded.

It is an object of the present invention to provide a hub for a star local area network that increases the link throughput by providing a means for reducing the number of collisions and the collision penalty when collisions do occur.

SUMMARY OF THE INVENTION

Briefly, the above object is accomplished in accordance with the invention by providing in a star local area network in which a plurality of stations are connected to a common hub, a selection means for selecting a preferred station and a preferred station frame from among ones of said plurality of stations that attempt to transmit a frame simultaneously. The selecting means includes means for performing a precedence algorithm, the ones of said plurality of stations that attempt to transmit a frame that are not selected being designated as non-preferred stations. Switching means connected to said selection means allows a preferred station frame (which includes a destination address) transmitted from said preferred station to pass through said common hub to said plurality of stations. A decoder decodes said destination address of said selected frame to thereby identify a destination station of said preferred station. A collision detection means connected to said switching means detects a collision detect signal from said non-preferred stations that attempt to transmit a frame. A buffer in said switching means stores said preferred station frame from said preferred station, upon the condition that said collision detection means detects a collision detect signal from said destination station.

In accordance with an aspect of the invention, said switching means includes a boundary detection means for detecting a logical boundary between transmitted frames, retransmission means connected to said boundary detection means and to said buffer means for retransmitting said preferred station frame from said buffer to said destination station immediately after detection of said logical boundary between transmitted frames; and, collision frame generating means connected to said buffer for generating a collision frame upon the condition that said preferred station frame is not successfully retransmitted from said buffer after a predetermined number of attempts.

The invention has the advantages that link throughput is increased, the preferred station (usually the file server) transmits a frame when there is no collision, thus it can release the transmit buffers earlier and be ready in advance for the next transmission.

The foregoing and other objects, features, and advantages of the invention will be apparent from the following more particular description of a preferred embodiment of the invention as illustrated in the accompanying drawings.

DESCRIPTION OF THE PREFERRED EMBODIMENT

IEEE 802.3 10 base T network Standard and 100 Mbps EtherNet Proposed Standard EtherNet is a local area network (LAN) standard capable of linking nodes using coaxial cable in a bus network topology. The IEEE 802.3 10 baseT network standard is an industry standard and 100 Mbps EtherNet is a proposed industry standard for a Carrier Sense Multiple Access/collision Detection (CSMA/CD) bus LAN and for a Carrier Sense Multiple Access/collision Avoidance (CSMA/CA) bus LAN. When several workstation nodes on a CSMA/CD network attempt to use the network at the same time, CSMA/CD specifies that each node stop transmission, wait a random amount of time, then try to transmit again. Before a workstation node on a CSMA/CD bus LAN transmits, it must first send a jam signal, wait a period of time, and then start transmission. If a jam signal from a second workstation node is detected while the first node's attempted transmission is in progress, then the first node must stop, draw a random number, wait a period of time, and then try access again.

The present invention conforms to the EtherNet standard and to the IEEE 802.3 10 baseT network standard. It will be readily understood by those skilled in the art that the invention can also be used with the 100 Mbps EtherNet proposed industry standard.

The EtherNet frame format is as follows:
7 bytes preamble
1 byte SFD
6 bytes Destination Address (DA)
6 bytes Source Address (SA)
2 type/frame length (LEN)
46-1500 bytes Data (250 bytes are assumed to be the average in this specification)
4 bytes Cyclical Redundancy Check (CRC)

Figure 1:
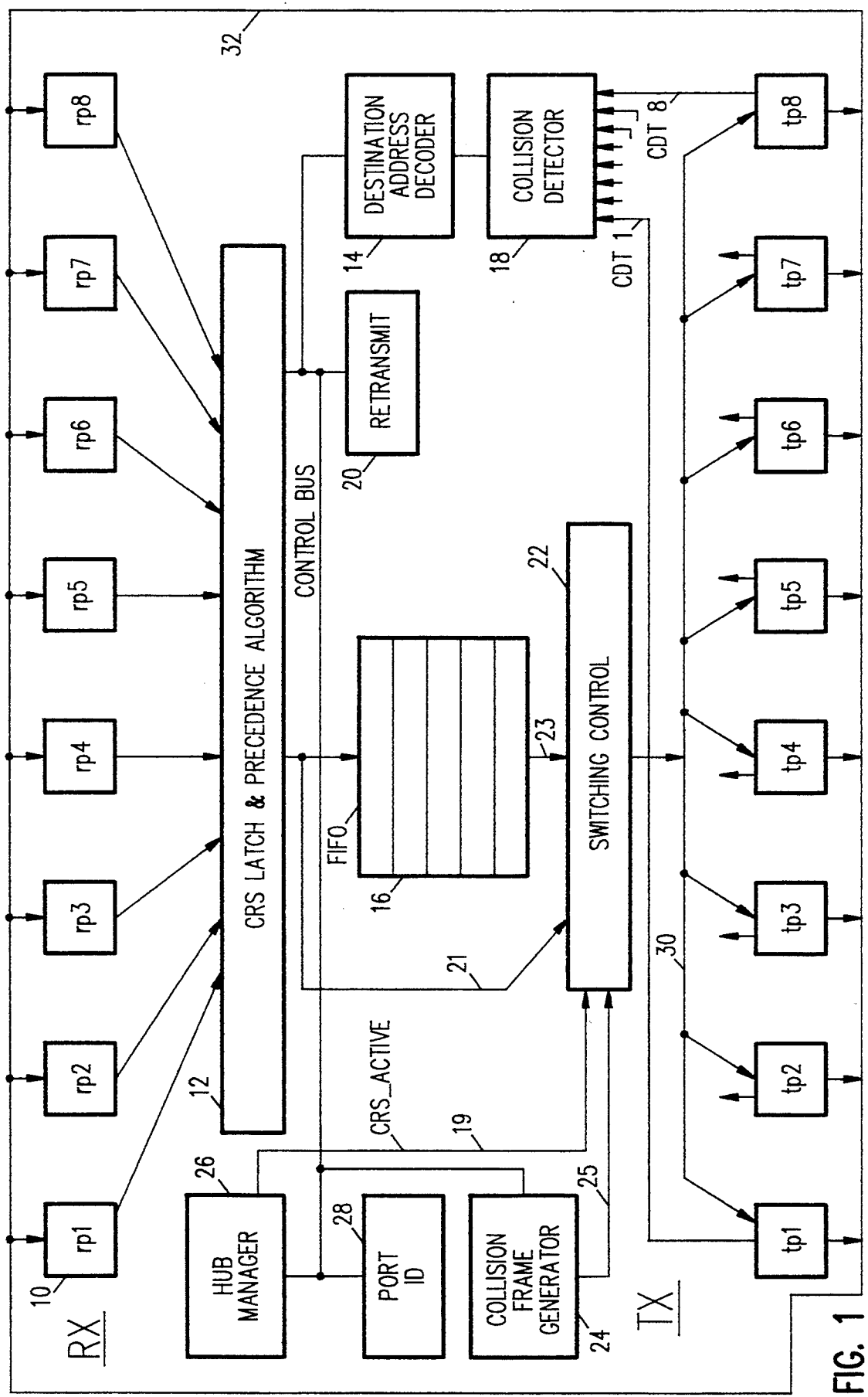
FIG. 1 is a block diagram of a star local area network in which the present invention is embodied.

Refer to FIG. 1 which is a block diagram of a star local area network in which the present invention is embodied. The Receive TPE Link Interface (10) is an array of n TPE transceivers (10) which interface between the rp (Receive Pair) connecting the link to the hub. n is defined as the number of ports in the hub. In FIG. 1 the number of ports is 8. The TPE transceivers may be, for example, Intel 82503/82521TB transceivers, but the invention will work properly with all TPE link interface transceivers/MAU with no limitations.

The CRS Latch & Precedence Algorithm logic (12) latches all the CRS (Carrier Sense) signals (CRS 1-CRS 8). A state machine is provided to handle the CRS# sampling. The sampled CRS are inputs to the Precedence Algorithm. The Precedence Algorithm selects a workstation which is designated the "preferred station". A state machine is provided to implement the precedence algorithm.

An internal small First In First Out (FIFO) buffer (16) is provided to temporarily store the preferred station frame. A state machine is provided to handle the FIFO. The FIFO is 64 to 180 bytes in depth.

Destination Address Decoder (14) decodes the destination address of the preferred station frame, which is stored in the internal FIFO (16). Destination address routing is described subsequently with reference to FIG. 3.

Collision Detector (18) detects a collision if it determines that the receiving station corresponding to the preferred station frame is also attempting to transmit. The collision is detected if the preferred frame Destination Address matches the non-preferred station list. The preferred station list is generated by the hub which determines which stations are attempting to transmit by monitoring the Carrier Sense (CRS#) signal corresponding to each station. A state machine is provided to handle the hub collision case.

The retransmit logic (20) is a retransmit mechanism for the FIFO. A retransmit of the preferred station frame from the FIFO is always performed immediately after IFS (Inter Frame Spacing) which is defined as 9.6 μS in the IEEE 802.3 standard.

The switching Control logic (22) controls switching from one of three sources to select a frame for transmission to the TPE link. The three sources are the preferred station frame (21) obtained directly from a station, the frame (23) stored in the FIFO, or the collision frame (25) from the collision frame generator (24). The preferred station is selected as described subsequently with reference to FIG. 2.

Hub manager (26) implements station management functions in accordance with the IEEE 802.3 standard, statistics and parameters for initialization.

PORT id (28) matches a port to the individual address (IA) station connected to this port.

Collision Frame Generator (24) issues a collision frame to the link when the hub exceeds the amount of time required to retransmit the preferred frame successfully.

Transmit TPE Link Interface (30) is an array of components that provide an interface between the preferred station frame transmitted from the hub and the tp transmit pair cable (32) connected to the stations. All the TX TPE interface components are connected to the same source of the switching control (22).

Hub Organization

A single station, called the preferred station, is dynamically selected to perform a transmission. When two or more stations attempt to transmit simultaneously, one "currently preferred" station is selected, while all others sense collisions. The currently preferred station is dynamically selected by performing a precedence algorithm which is a fairness and deterministic algorithm. If the station receiving from the preferred station also attempts to transmit, then it senses a collision and the hub causes it to recover and enable receiving before transmitting a frame. This is done by delaying the preferred station frame in a small internal FIFO. The hub re-sends the frame from the internal FIFO immediately after IFS while the receive station usually attempts to transmit later. In most cases this ensures a successful reception of the frame. If after a number of attempts the hub does not succeed in transmitting the frame successfully then the hub generates a collision frame.

The hub is implemented in conformance with the IEEE 802.3 10 baseT network standard for a star topology architecture. For each station that has a frame to transmit, first a check is made lo determine if the link was idle for IFS time. The hub starts to simultaneously receive all of the transmitted frames. The hub senses which stations are attempting to transmit by sensing the Carrier Sense (CRS#) signal corresponding to each station.

The precedence algorithm selects the preferred station. The hub switches the Transmit Pair tip) of the preferred station to the Receive Pair (rp) of all the stations in the network, except the preferred station itself. All of the stations, including the destination station whose address is in the preferred station frame, start to receive the preferred station frame.

The non-preferred stations which also attempted to transmit start to receive the frame. Each TPE transceiver senses bi-directional traffic on the link and activates the Collision Detect signal (CDT#). The non-preferred stations stop their transmission immediately, and perform a jam and backoff as defined in IEEE 802.3 10 baseT standard.

The hub logic behaves differently for the following two cases with respect to a preferred station destination address:

Case A: the destination station is not a non-preferred station.

Case B: the destination station is a non-preferred station which also attempted to transmit.

Collision Detection

Collision is the detection of bi-directional traffic in the Receive Pair and in the Transmit Pair link (32) between a station and the hub. The hub identifies the collision case as follows: the hub marks-up all of the non-preferred stations that attempted to transmit and that participated in the precedence algorithm. In parallel with switching the tp of the preferred station the hub stores the preferred station frame in the FIFO temporary buffer (16) and the destination address in the frame is decoded. If the address of a non-preferred station is matched with the destination address in the frame, the hub identifies case B, otherwise it is case A. The destination address length in EtherNet protocol is 6 bytes (4.8 micro sec.). Therefore, in the worst case the hub collision detection takes 4.8 micro sec. There may be cases where the hub decodes the destination address earlier after the second or even the first byte. Overall the hub collision detection takes between 0.8 micro sec to 4.8 micro sec.

The hub manager (26) asserts CRS_ACTIVE (19) to the switching control (22). The switching control (22) routes CRS_ACTIVE to all of the stations except the destination station and the preferred station. The destination station is identified by decoding the destination address of the preferred station frame. Generating of CRS_ACTIVE during all the transmission and retransmission time to all the other stations ensures that all the other stations will not attempt to link until completion of the preferred frame retransmission.

Case A: No collision

This is the case wherein the receiving station does not also transmit a frame. "No collision" means that there is no collision between the "currently preferred" station and the receiving station to which the currently preferred station is transmitting. The destination station is not a non-preferred station, thus, it does not affect the performance. This station is therefore ready to receive a frame. When the destination address in the frame matches the station address the frame is received until ended successfully.

Case B: Collision

This is the case wherein the receiving station also attempts to transmit. A destination station is the receiving station of the preferred station frame. In case B, a destination station is also a non-preferred station. A non-preferred station is a station that attempted to access the link but was not selected by the precedence algorithm.

"Collision" means that there is a collision between the currently preferred station and the receiving station to which the currently preferred station is transmitting, which receiving station also attempts to transmit. The destination station is a non-preferred station. This station collides and must backoff. Therefore, the receive frame is discarded. As defined by a backoff algorithm, the destination station draws a random number between 0 and $2^{**}n-1$ (where n is the number of collisions that the destination frame has encountered so far).

1) Random number>0:

Assume that the destination station draws a random number greater than 0. The station is in backoff while it is ensured that the hub attempts to transmit from the FIFO immediately after IFS (backoff 0). Therefore, no collision is encountered between the hub and the destination station. The hub re-sends the preferred frame, the destination station enters DEFER until the transmission is completed successfully. The probability for successful transmission is increased as (n) increases.

2) Random number=0:

Assume that the destination station draws a random number equal to 0. Therefore, the hub and the destination station are collided. There are two consecutive options:
1. Re-send cycle. If the FIFO is big enough (greater than 54 bytes) it can maintain a few re-sends from the hub. As the number of collisions is increased the probability of completing the transmission successfully is increased.
2. Collision frame. If the hub exhausts all of its transmission attempts and it collides with the destination station, then the hub generates a collision frame which is sent to the preferred station to indicate that the frame was not transmitted successfully. If the collision frame is generated during the slot time (51.2 micro sec.) it is encountered as a collision. If the collision frame is generated after the slot time (51.2 micro sec.) is completed, it is encountered as a "late collision". A collision frame is a frame that is identified as collision by the "traditional" collision detect mechanism: short frame, bad CRC.

The Precedence Algorithm

Three algorithms are possible candidates for the precedence algorithm:
1. Priority order.
2. Round-Robin—A cyclic order.
3. Generalized Round-Robin—A cyclic order with a switch to file server between every two stations. The file server gains overall 50% of the link utilization and the rest of the stations share the rest.

The preferred embodiment uses the Generalized Round Robin algorithm. By this the file server has a relative priority, but the other stations do not suffer from starvation.

Optimum FIFO depth to Ensure Good Transmission

There is a way to ensure a 100% confidence level that a preferred station will succeed in transmitting a frame successfully and thus there will not be a need to issue a collision frame from the hub to the preferred station. In order to achieve this, it is necessary to increase the FIFO depth and the number of hub attempts to re-send from the FIFO. It is guaranteed that in case of a collision between two stations only, there is a negligible probability of having excessive collisions, that is, more than 16 collisions consistently. This approach supports the situation wherein a collision is detected after preamble time in the case of long segments between hubs.

Jam and Backoff

The IEEE 802.3 10 baseT network standard for a Carrier Sense Multiple Access/collision Avoidance (CSSMA/CA) bus LAN specifies that before a workstation node on a CSMA/CA bus LAN transmits, it must first send a jam signal, wait a period of time, and then start transmission. If a jam signal from a second workstation node is detected while the first node's attempted transmission is in progress, then the first node must "backoff", that is, stop, wait a period of time, and then try access again.

Message transfer protocol sequence

Figure 2:
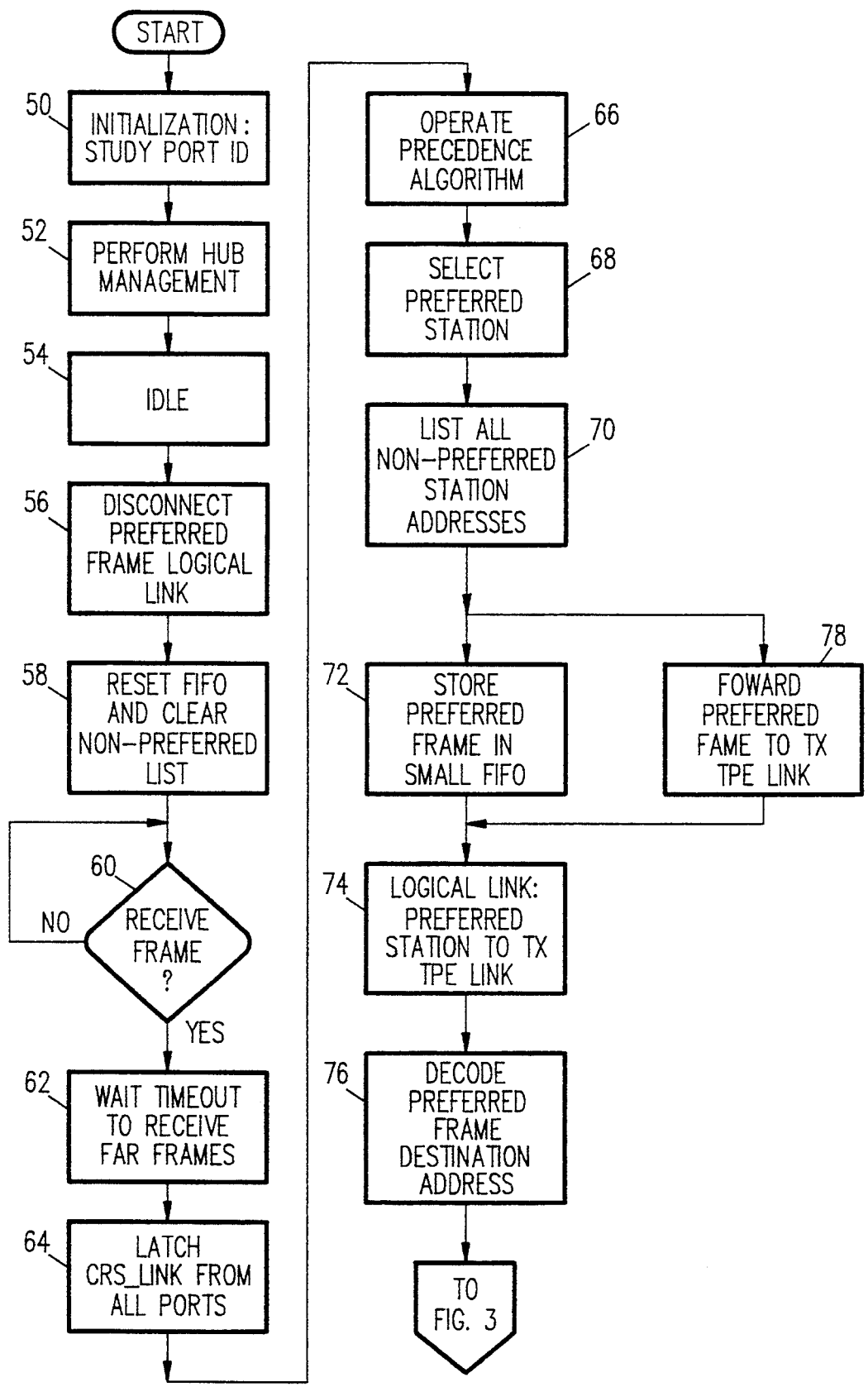
FIGS. 2 and 3 are flow diagrams of a message transfer protocol sequence.
Figure 3:
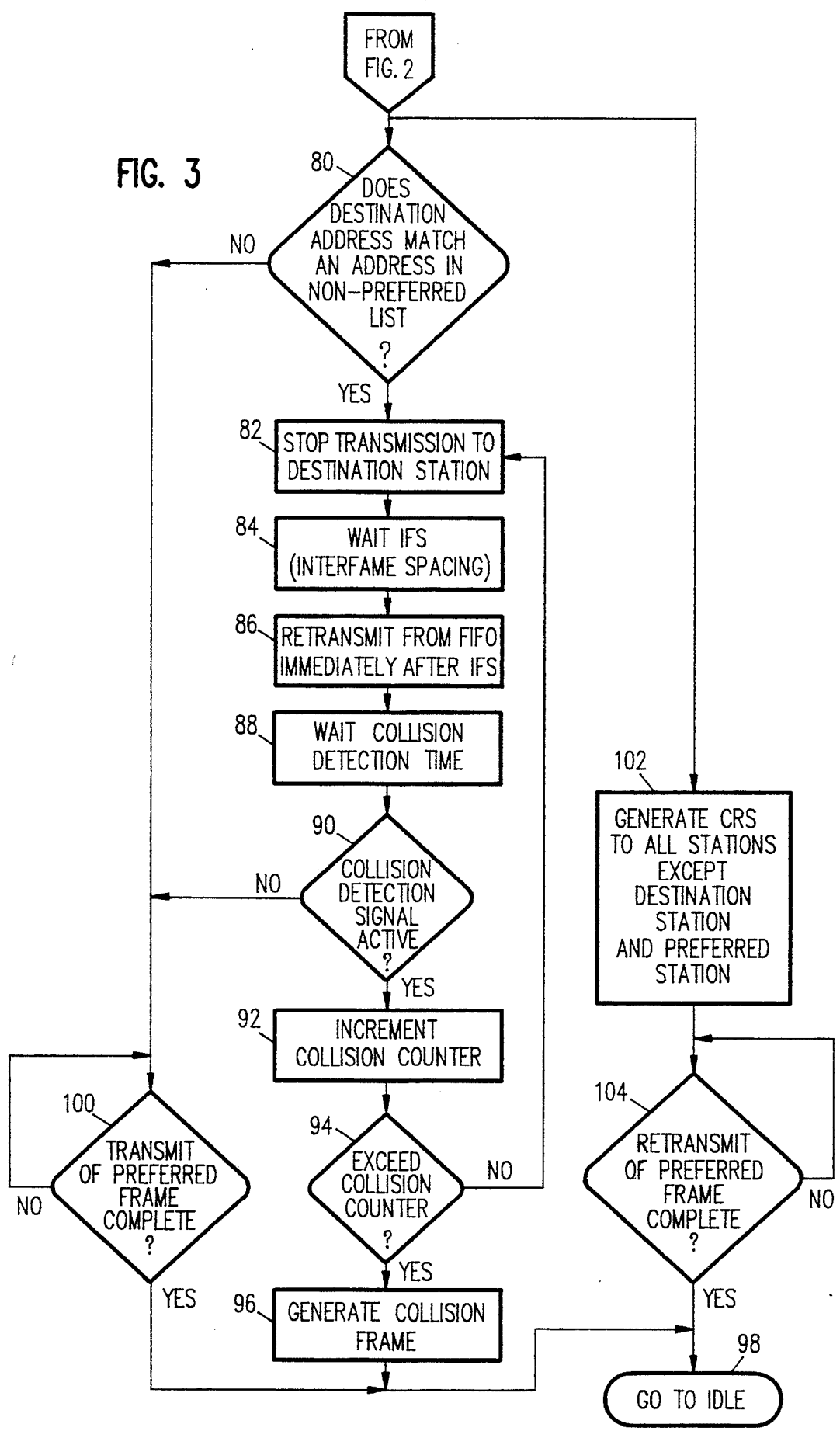

FIG. 2 and FIG. 3 are flow diagrams of the message transfer protocol sequence.

Hub Initialization

Refer to FIG. 2. Prior to receiving a frame, the hub initializes itself by first studying the port ID (50) and performing station management functions in accordance with the IEEE 802.3 standard, statistics and parameters for initialization. After an idle period (54), the hub disconnects preferred frame logical link (56), resets the FIFO and clears non-preferred list (58).

Main Flow

After initialization the hub is now ready to receive a frame (60). The hub waits a time-out period to allow time to receive far frames (62). The hub then latches the carrier sense (CRS) signals on the CRS link from all ports (64). Using these signals, the hub operates the precedence algorithm (66). The logic selects the preferred station and lists all non-preferred stations (68). In parallel, the preferred frame is stored in the small FIFO (72) and the preferred frame is forwarded to the transmit (TX) TPE link (78).

Collision

The hub establishes a logical link of the preferred station to TX TPE link (74) and decodes preferred frame destination address (76). The flow continues on FIG. 3. It continues in parallel to block (102) and to block (80). The hub generates CRS_ACTIVE (19) to all stations except the destination station and the preferred station (102), completes retransmission of the preferred frame (104) and goes to an idle state (98) when complete. Also, in parallel, the destination address of the preferred station frame is compared with the addresses in the non-preferred station list (80). If a match is found (YES), then the hub performs:

1. Stops transmission to the destination station (82).
2. Waits for the Inter Frame Spacing (84).
3. Retransmits from the FIFO immediately after the IFS (86).
4. Waits for the collision detection time (88).

Retransmit

5. If the collision detection signal is active, a YES from decision block (90), then the hub increments the collision counter (92).
6. If the collision counter is exceeded, a YES from decision block (94), then the hub generates a collision frame (96) and go to idle (98).
7. If the collision detection signal is not active in step 6 above, a NO from decision block (90), then the hub completes transmission of the preferred frame (100) and goes to idle (98) when complete.
8. If the collision counter is not exceeded in step 7 above, a NO from decision block (94), then steps 1–8 are repeated until the collision counter is exceeded.

If when the destination address of the preferred station frame is compared with the addresses in the non-preferred station list (80), no match occurs, a NO from decision block (80), the hub completes transmission of the preferred frame (100) and goes to idle (98) when complete.

Timing Diagrams

For the average case, the following times prevail:

1. Collision time = 14.4 $\mu$S which breaks down as follows:
   Frame preamble = 6.4 $\mu$S.
   Jam = 3.2 $\mu$S
   Collision detection = 0.8 $\mu$S (min.) to 4.8 $\mu$S (max.)
2. IFS (Inter Frame Spacing) time = 9.6 $\mu$S
3. Average frame time = 214.4 $\mu$S, the frame consisting of:
   6 bytes Destination Address (DA)
   6 bytes Source Address (SA)
   2 type/frame length (LEN)
   250 bytes Data
   4 bytes Cyclical Redundancy Check (CRC)

The total collision overhead on the first hub transmission attempt (1+2) = 24 $\mu$S The total collision overhead on the second hub transmission attempt = 43.2 $\mu$S. This is the sum of 24 $\mu$S collision, plus 9.6 $\mu$S preamble and jam, plus 9.6 $\mu$S IFS (Inter Frame Spacing) time.

Figure 4:
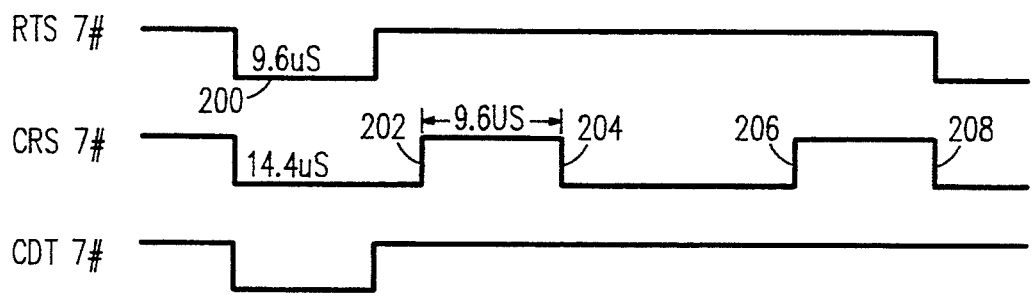
FIG. 4 is a timing diagram of collision with a non-preferred station.

Refer to FIG. 4 which is a timing diagram of collision between a preferred station (#2) with a non-preferred station (#7). The timing overhead for a collision in this case is 24 $\mu$S. This is the sum of 4.8 $\mu$S, the time required for collision detection, plus 9.6 $\mu$S preamble and jam, plus 9.6 $\mu$S IFS (Inter Frame Spacing) time. The station #7 encounters the collision during the frame preamble but the hub continues to activate the CRS 7# signal until the collision is detected by the destination address in the frame (202). After 24 $\mu$S (204), the hub resends the preferred frame of station #2 from the FIFO buffer and Station #7 completes the backoff and enters the DEFER state. At the time (206) the hub has completed the preferred frame transmission and station #7 is in IFS time. The total elapsed time is good Tx time + 24 $\mu$S, 24 $\mu$S being the collision overhead. At time (208) station #7 becomes the preferred station and transmits a frame successfully after completion of the DEFER and after it has received the preferred station frame from the FIFO.

Figure 5:
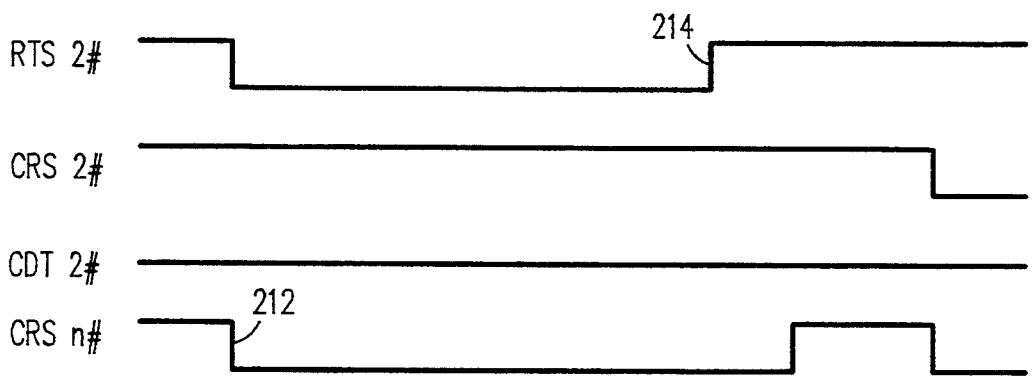
FIG. 5 is a timing diagram of serial operation of a non-preferred station.

Refer to FIG. 5 which is a timing diagram of serial operation of a preferred station #2. Station #2 transmits a frame and does not encounter any collision. The frame is stored in the FIFO from which it is transmitted during the time (212). Station #2 completes the transmission to the FIFO (214). The frame transmission from the FIFO to the destination station continues. The CRS n# lines from all of the stations (except the destination station CRS7#) are ORed with the preferred station RTS 2# to the hub RTS # line.

Improvement of the Preferred Embodiment

An improvement of the preferred embodiment will now be described with reference to FIG. 6 and FIG. 7. It will be understood by those skilled in the art that the invention as described above will work properly without implementing the improvement to be described in the following paragraphs.

There is a way to improve the hub performance when using an EtherNet controller which meets the following two parameters of the EtherNet (DEC TM) standard:

1 Minimum time between end of transmission to beginning of reception is 40 bit-time (4 $\mu$S).
2 IFS Re-trigger time—⅔ IFS, 64 bit-time (6.4 $\mu$S).

Force to DEFER

A collision occurs when a receiving station corresponding to the preferred station frame is also attempting to transmit. The collision is detected if the preferred station frame Destination Address matches the non-preferred station list. When such a collision occurs, the hub inactivates the Rp link for only 4 micro sec. This ensures that the station is ready again to receive a frame.

Then the hub forwards the non-preferred frame again. The transmission activity in the first ⅔ of IFS causes the station to re-trigger the IFS. The station will receive the frame successfully and will not attempt to link because the CRS# signal will stay active during all of the reception. Thus, the IFS timer is not resumed and the station is forced to DEFER.

All the hub mechanism remains the same except one change in case of collision: The hub attempts to re-send the preferred frame from the FIFO 4 micro sec. after the beginning of IFS. This ensures that the non-preferred station is never collided with the hub because it is forced to DEFER.

The hub performance is increased in the case of collision because the collision overhead is reduced to 18.4 $\mu$S from 24 $\mu$S or 43.2 $\mu$s in the second attempt.

Figure 6:
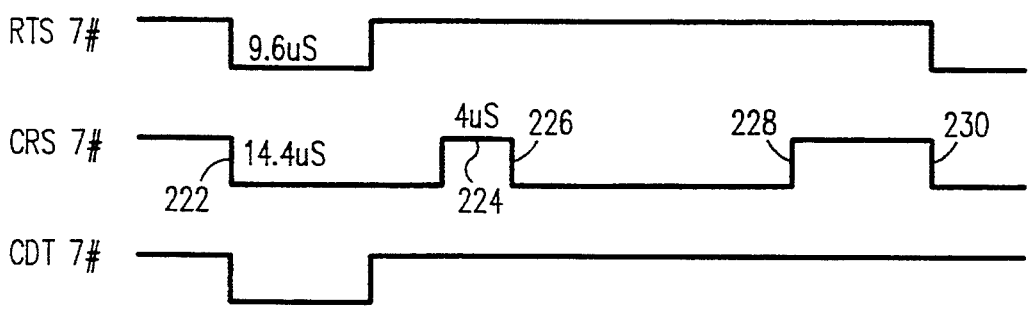
FIG. 6 is a timing diagram of improved situation of collision with a non-preferred station; and, FIG. 7 is a timing diagram of improved serial operation of a non-preferred station.

Refer to FIG. 6 which is a timing diagram of the improved situation of collision with a non-preferred station. A collision occurs between the preferred station #2 and a non-preferred station #7. The overhead collision time (222) is 14.4 $\mu$S. During the first 4 $\mu$S of IFS time (224) station #7 is in IFS and backoff. The hub resends the preferred frame of station #2 from the FIFO (226), IFS is retriggered, and station #7 enters the DEFER state. At (228) the hub has completed the preferred frame transmission and station #7 is in IFS time. Station #7 transmits a frame (230) after the DEFER and IFS time.

Figure 7:
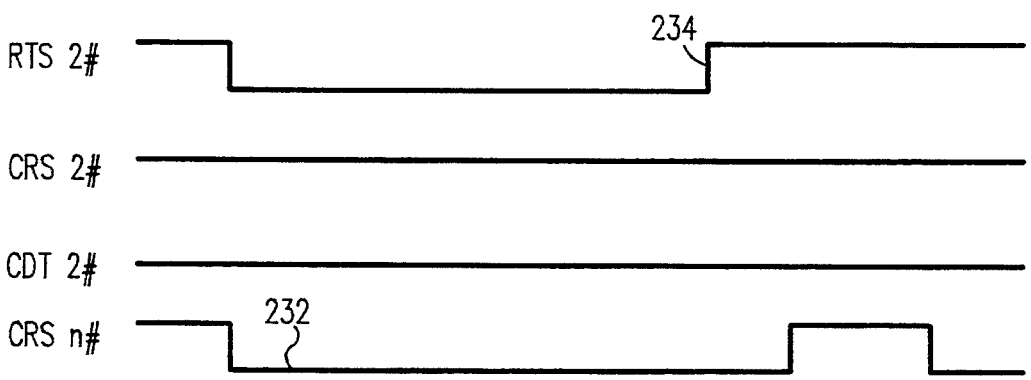

Refer to FIG. 7 which is a timing diagram of improved serial operation of a non-preferred station. Station #2 transmits a frame and does not encounter any collision. The frame is stored in the FIFO from which it is transmitted during the time (232). Station #2 completes the transmission to the FIFO (234). The frame transmission from the FIFO to the non-preferred station continues. The CRS n# lines from all of the stations are ORed with the preferred station RTS 2# to the hub RTS # line.

While the invention has been particularly shown and described with reference to preferred embodiments thereof, it will be understood by those skilled in the art that the foregoing and other changes in form and detail may be made therein without departing from the scope of the invention.

What is claimed is:

1. In a star local area network in which a plurality of stations are connected to a common hub, each one of said stations having a collision detect signal line connected to said hub, the improvement in said hub comprising:

selection means for selecting a preferred station and a preferred station frame from among ones of said plurality of stations that attempt to transmit a frame simultaneously, said selecting means including means for performing a precedence algorithm, the ones of said plurality of stations that attempt to transmit a frame that are not selected being designated as non-preferred stations;

said preferred station frame including a destination address;

said destination address identifying a destination station;

switching means connected to said selection means for allowing said preferred station frame transmitted from said preferred station to pass through said common hub to said plurality of stations;

means for decoding said destination address of said preferred station frame;

collision detection means connected to each collision detect line and to said switching means for detecting a collision detect signal on collision detect lines from said non-preferred stations that attempt to transmit a frame;

said switching means including buffer means for storing said preferred station frame from said preferred station, upon a condition that said collision detection means detects a collision detect signal from said destination station;

boundary detection means for detecting a logical boundary between transmitted frames;

retransmission means connected to said boundary detection means and to said buffer means for retransmitting said preferred station frame from said buffer to said destination station immediately after detection of said logical boundary between transmitted frames; and, collision frame generating means connected to said buffer means for generating a collision frame upon a condition that said preferred station frame is not successfully retransmitted from said buffer after a predetermined number of attempts.

2. The combination in accordance with claim 1 wherein said buffer means for storing said preferred station frame from said preferred station is comprised of a first-in first-out buffer of a minimum depth equal to the number of preferred station frames that are receivable from said plurality of stations attached to said hub.

3. The combination in accordance with claim 1 wherein said buffer means for storing said preferred station frame from said preferred station is comprised of a first-in first-out buffer of a minimum depth sufficient to accommodate said predetermined number of frame retransmission attempts of said hub.

4. In a star local area network in which a plurality of stations are connected to a common hub, each of said stations including means for generating a collision detect signal, the improvement in said hub comprising:

selection logic for selecting a preferred station and a preferred station frame from among ones of said plurality of stations that attempt to transmit a frame simultaneously, said selection logic including a precedence algorithm logic, the ones of said plurality of stations that attempt to transmit a frame that are not selected being designated as non-preferred stations;

said preferred station frame including a destination address;

a switching control connected to said selection logic for allowing said preferred station frame transmitted from said preferred station to pass through said common hub to said plurality of stations;

a destination address decoder for decoding said destination address of said selected frame to thereby identify a destination station of said preferred station;

a collision detector connected to said switching logic for detecting a collision detect signal from said non-preferred stations that attempt to transmit a frame;

said switching logic including a buffer for storing said preferred station frame from said preferred station, upon a condition that said collision detector detects a collision detect signal from said destination station;

boundary detection means for detecting a logical boundary between transmitted frames;

a retransmit logic connected to said boundary detection logic and to said buffer for retransmitting said preferred station frame from said buffer to said destination station immediately after detection of said logical boundary between transmitted frames; and, a collision frame generator connected to said buffer for generating a collision frame upon a condition that said preferred station frame is not successfully retransmitted from said buffer after a predetermined number of attempts.

5. The combination in accordance with claim 4 wherein said buffer is comprised of a first-in first-out buffer of a minimum depth equal to the number of preferred station frames that are receivable from said plurality number of stations attached to said hub.

6. The combination in accordance with claim 4 wherein said buffer means for storing said preferred station frame from said preferred station is comprised of a first-in first-out buffer of a minimum depth sufficient to accommodate said predetermined number of frame retransmission attempts of said hub.

7. A method of transmitting message frames within a star local area network in which a plurality of stations are connected to a common hub, comprising the steps of:

A. selecting a preferred station from among ones of said plurality of stations that attempt to transmit a frame simultaneously, said selecting being done by performing a precedence algorithm at said common hub, the ones of said plurality of stations that attempt to transmit a frame that are not selected being designated as non-preferred stations;

B. allowing a preferred station frame transmitted from said preferred station to pass through said common hub to said plurality of stations;

C. sensing collisions in all of said non-preferred stations that attempt to transmit a frame;

D. stopping transmission at all of said non-preferred stations that sense a collision;

E. storing said preferred frame from said preferred station in a buffer in said hub, upon a condition that a destination station receiving from said preferred station transmits a destination station frame;

F. retransmitting said preferred station frame from said buffer to said destination station immediately after a logical boundary between transmitted frames, upon a condition that a collision occurs between said preferred station and said destination station; and, G. generating a collision frame at said common hub upon a condition that said preferred station frame is not successfully retransmitted from said buffer after a predetermined number of attempts.

* * * * *

UNITED STATES PATENT AND TRADEMARK OFFICE
CERTIFICATE OF CORRECTION

PATENT : 5,351,241

DATED : Sep. 27, 1994

INVENTOR(S) : Kurts

It is certified that error appears in the above-identified patent and that said Letters Patent is hereby corrected as shown below:

On the title page; "Mivtza Yehonatan" should read -- Tsvika Kurts--.

Signed and Sealed this

Seventeenth Day of January, 1995

Attest:

BRUCE LEHMAN

*Attesting Officer*     *Commissioner of Patents and Trademarks*